Oct. 31, 1950 W. L. PLAXCO 2,528,076
ANTIJACKKNIFE APPARATUS FOR
TRAILER-TRACTOR CONNECTION
Filed Aug. 2, 1949 3 Sheets-Sheet 3

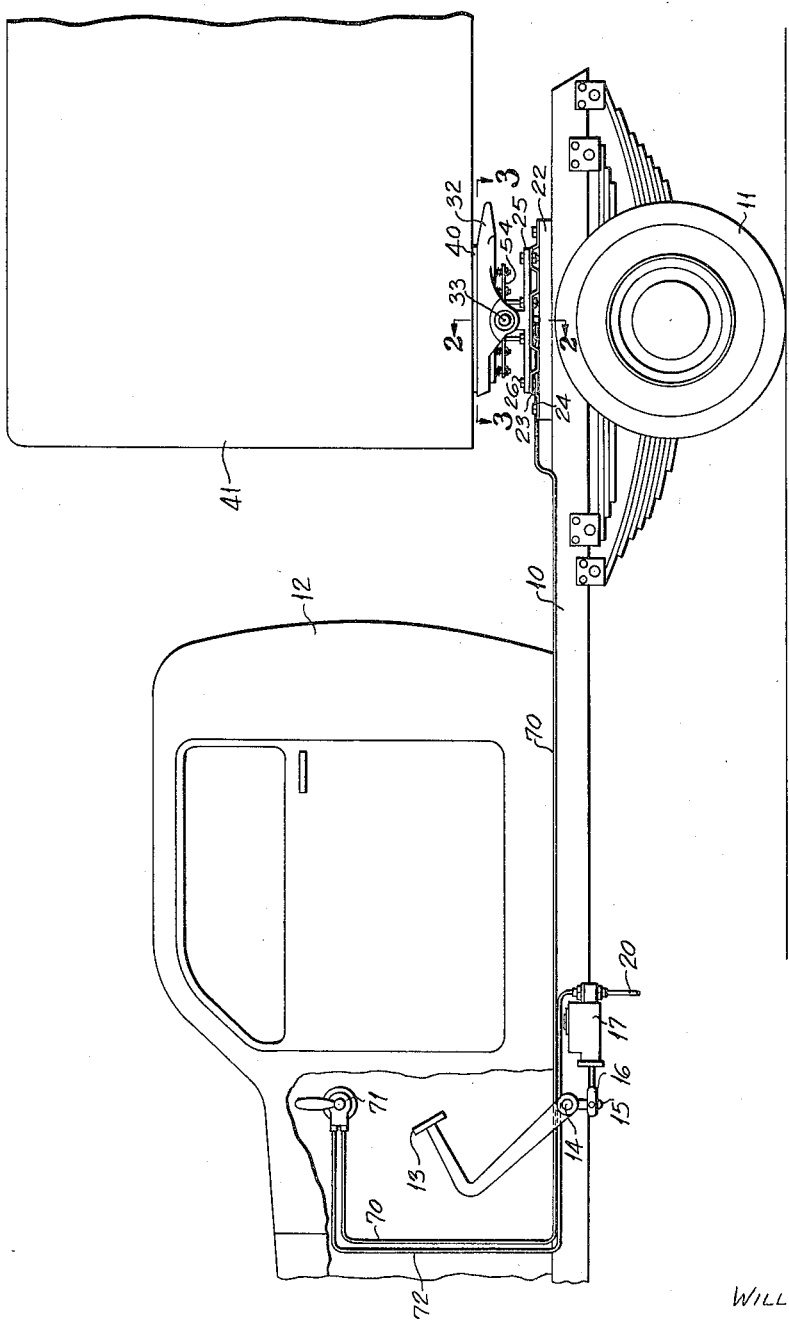

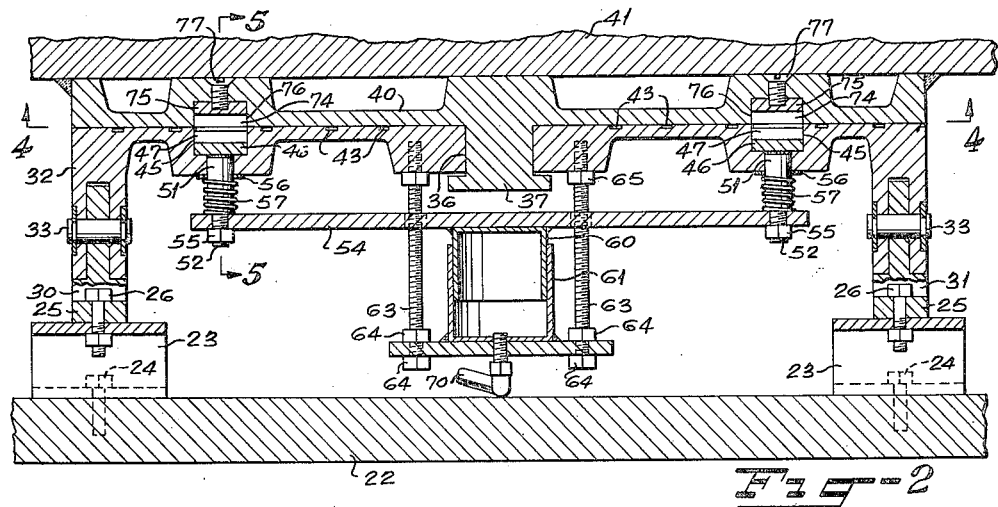
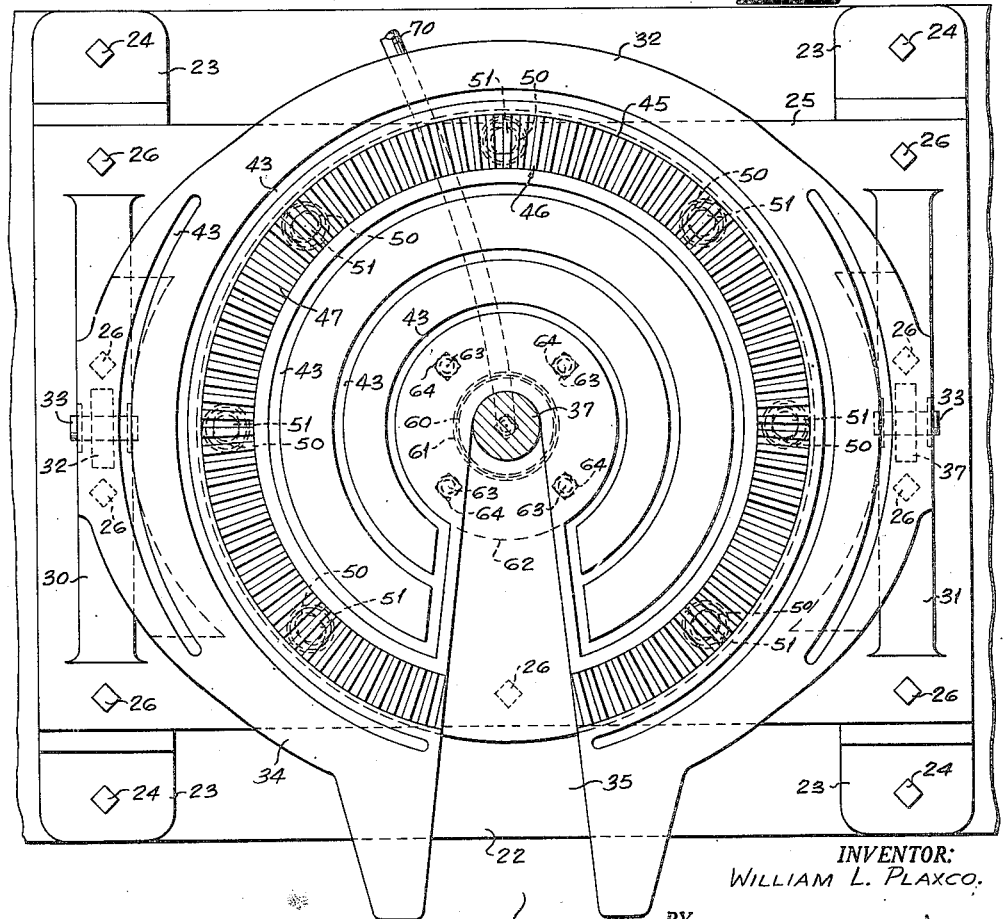

INVENTOR:
WILLIAM L. PLAXCO.
BY
ATTORNEY

Patented Oct. 31, 1950

2,528,076

UNITED STATES PATENT OFFICE 2,528,076

ANTIJACKKNIFE APPARATUS FOR TRAILER-TRACTOR CONNECTION

William L. Plaxco, Charlotte, N. C., assignor of one-half to Allen M. Berryhill, Charlotte, N. C.

Application August 2, 1949, Serial No. 108,098

10 Claims. (Cl. 280—33.05)

1

This invention relates to safety apparatus for trailers and tractors and more especially to an improved anti-jack-knife apparatus adapted to be mounted on the fifth wheel of the tractor and to prevent "jack-knifing" of semi-trailers connected to the tractor through the medium of the fifth wheel.

"Jack-knifing" is the term applied to the swinging of a trailer out of the mean path of travel of the tractor to which it is connected and which is invariably caused by the skidding of the ground wheels on either the tractor or the trailer or on both vehicles and as a result of which the two vehicles close upon one another similar to the blades of a jack knife.

Although the relative swinging movement between the trailer and the tractor, while moving at an excessive speed, is not particularly hazardous as long as the speed of the tractor is equal to or greater than the speed of the trailer, deceleration of the tractor or application of the brakes of the tractor and the trailer may cause the trailer to swing to an excessive angle relative to the tractor. This is especially true in the event the brakes of the tractor respond more quickly or hold more firmly than the brakes of the trailer. Various attempts have been made to provide means for overcoming the jack-knifing tendency of the trailer relative to the tractor under the conditions heretofore stated, however, none of these has been effective to react regardless of the angularity of the trailer relative to the tractor, as a result of which the rear end of the trailer would have to move through a predetermined arc before the anti-jack-knife device on the fifth wheel of the tractor would become effective. By this time, the trailer would have built up such momentum in its arcuate movement as to either overcome the effect of the jack knife device or to cause the tractor to also be swung around with the trailer and, usually, at such momentum as to cause both the tractor and the trailer to turn over.

It is therefore an object of this invention to provide an anti-jack-knife apparatus for a tractor-trailer vehicle combination which is actuated in cooperating relationship to the braking system of the tractor and the trailer, the trailer and the tractor having cooperating members thereon which are immediately intermeshed upon the brakes being applied to thus restrain any further tendency of the trailer to move to a greater angle relative to the longitudinal axis of the tractor.

More specifically, it is an object of this invention to provide a tractor-trailer combination, wherein a fifth wheel is employed on the tractor

2 for slidably and rotatably supporting the front end of a trailer, having a fixed annular member in the lower surface at the front end of the trailer and having gear teeth depending therefrom, a substantially annular member mounted for vertical sliding movement in the fifth wheel and having gear teeth in the upper surface thereof and means controlled by the operator controlled brake mechanism of the tractor for moving the substantially annular member in the fifth wheel upwardly and into engagement with the annular member in the front of the trailer to thus intermesh the teeth on the proximate faces of the annular members and to thereby lock the trailer in a fixed position relative to the longitudinal axis of the tractor.

It is still another object of this invention to provide automatic releasing means for again moving the substantially annular member on the fifth wheel out of engagement with the annular member in the front of the trailer simultaneously with the brakes being released by the operator of the vehicle to thus permit further movement of the trailer relative to the longitudinal axis of the tractor as desired.

Some of the objects of the invention having been stated, other objects will appear as the description proceeds, when taken in connection with the accompanying drawings, in which—

Figure 1 is a side elevation of a tractor showing the front portion of a trailer connected thereto and showing the present invention in association therewith;

Figure 2 is an enlarged vertical sectional view taken substantially along the line 2—2 in Figure 1 and showing the fifth wheel connection between the trailer and the tractor;

Figure 3 is an enlarged plan view, showing the king pin in cross section, and is taken substantially along the line 3—3 in Figure 1 and showing particularly how the vertically movable substantially annular gear is mounted in the fifth wheel of the tractor;

Figure 4:
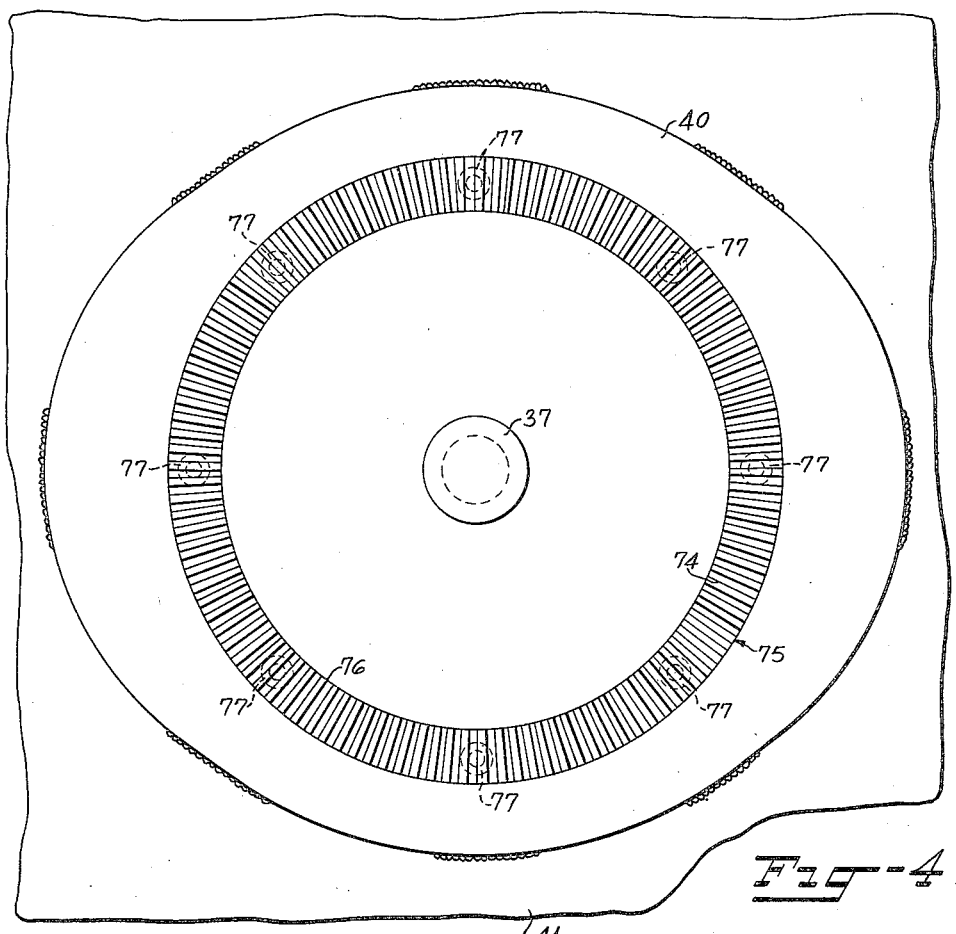
Figure 4 is an inverted plan view looking substantially along the line 4—4 in Figure 2 and showing the mating fifth wheel plate secured to the bottom of the front portion of the trailer and which is adapted to be engaged by the fifth wheel of the tractor as shown in Figure 1.

Referring more specifically to the drawings, the numeral 10 indicates the frame of the tractor which is supported on ground wheels 11 only one of which is shown in Figure 1. This frame 10 also supports a cab 12, a portion of which is shown broken away in Figure 1 and in which the usual brake pedal 13 is disposed, its lower end being oscillatably mounted as at 14 on the frame 10 of the tractor. The lower end of the pedal 13 has a downwardly projecting portion 15 integral therewith which is connected to the front end of a conventional piston rod 16 which has longitudinal sliding movement in the usual master cylinder 17 of the braking system of the tractor. This master cylinder has a pipe 20 extending from the lower end thereof which is connected to the brakes in the wheels of the vehicle in the usual manner and an illustration and description of which is deemed unnecessary.

The tractor chassis 10 has a conventional horizontally disposed plate 22 secured thereto in a conventional manner and disposed above the rear wheels 11 of the chassis 10. Conventional corrugated strap iron members 23 are secured to the plate 22 as by bolts 24. A conventional support member 25 is secured, as by bolts 26, to the corrugated strap iron members 23.

The support member 25 has upwardly projecting flanges 30 and 31 cast integral therewith (Figures 2 and 3) on which a fifth wheel 32 is oscillatably mounted as at 33. The fifth wheel 32 is preferably of a cast material and has a substantially flat upper surface 34 and also has a slot 35 therein which is divergent, as at 36, at its rear end for receiving a conventional king pin 37 integral with a cast mating fifth wheel plate member 40 suitably secured, as by welding, to the lower surface of a semi-trailer 41, the front portion of which is shown in Figure 1. The fifth wheel plate 40 with its king pin 37 is shown in Fig. 4 removed from the fifth wheel 32.

The fifth wheel 32 is provided with lubrication grooves 43 spaced about the upper surface 34 thereof since the plate 40 and the fifth wheel 32 are adapted to have rotational sliding movement against each other when assembled as shown in Figures 1 and 2. Conventional locking means are usually provided in association with the king pin 37 and the fifth wheel 32 for locking the king pin 37 for rotational movement relative to the fifth wheel 32. However, the locking means is not pertinent to the present invention and a showing of the same in the drawings would merely lend to confusion, and therefore a description or illustration of the locking means is omitted. However, this locking means may be any one of several types to automatically lock the king pin 37 in the forward end of the slot 35. The structure heretofore described comprises the usual parts of a tractor and its means for connecting the same to a semi-trailer and it is with these parts that the present invention is adapted to be associated.

The fifth wheel 32 has a substantially circular groove 45 in the upper surface 34 thereof which is centrally located relative to the fifth wheel 32 and the continuity of which is interruped only by the slot 35 in the fifth wheel 32. A substantially annular gear member 46, having gear teeth 47 cut in its upper surface, is mounted for vertical sliding movement in the substantially circular groove 45 and this gear member 46 is also cut away so as to not extend across the slot 35 through which the king pin 37 passes as the trailer and the tractor are being moved into engagement with one another, or disengaged from each other.

The fifth wheel 32 has a plurality of arcuately spaced slots 50 therein which communicate with the substantially circular groove 45 and which are slidably penetrated by guide pins 51, the upper ends of which are secured, as by welding, to the lower surface of the gear member 46 and the lower ends of which are restricted as at 52. The restricted lower ends of the guide pins 51 slidably penetrate a substantially circular plate 54 which is secured to the pins 51 as by nuts 55 threadably mounted on the restricted lower ends 52 of the pins 51. Suitable washers 56 surround the pins 51 and each of the pins 51 has a compression spring 57 therearound the upper end of which engages the lower surface of the washer 56 and the lower end of which engages the upper surface of the plate 54 and it is thus seen that these compression springs 57 normally urge the plate 54 and the gear member 46 downwardly in Figure 2 to where the lower surface of the gear member 46 will engage the bottom of the substantially circular groove 45 and the upper edges of the gear teeth 47 will be flush with or below the surface 34.

Secured, as by welding, to the lower surface of the plate 54, and substantially in the center thereof, is the upper end of a piston 60 which has vertical sliding movement in a cylinder 61 which may contain an actuating fluid or liquid, not shown. The lower end of the cylinder 61 is secured, as by welding, to the upper surface of a substantially circular plate 62 which is penetrated by the lower ends of a plurality of circularly spaced rods 63 and is secured thereto as by lock nuts 64 threadably mounted on the rods 63. The rods 63 extend upwardly and loosely penetrate the plate 54 and their upper ends are threadably imbedded in the lower portion of the fifth wheel 32. Suitable lock nuts 65 are also threadably mounted on the upper portions of the guide rods 63 and bear against the lower surface of the fifth wheel 32 to thus lock the rods 63 in an adjusted position relative to the vertical.

The rearmost end of a pipe line 70 threadably penetrates the plate 62 as well as the lower end of the cylinder 61 (Figure 2) and, as will be observed in Figure 1, the pipe line 70 then extends forwardly parallel to the chassis 10 and then upwardly and is connected to a suitable manually operable valve 71 which may be mounted on the dash board of the tractor within reach of the operator within the cab 12. A pipe line then extends from the valve 71 to the master cylinder 17 and, upon moving the foot pedal 13 in a counterclockwise direction in Figure 1, fluid in the cylinder 17 and the pipes 70 and 72 is placed under pressure and it is thus seen that the pipes 70 and 72 and the valve 71 establish communication between the master cylinder 17 and the lower end of the cylinder 61 in Figure 2.

Upon application of the brakes of the vehicle by an operator; that is, upon moving the foot pedal 13 in a counterclockwise direction in Figure 1, the fluid in the pipe piles 72 and 70 is placed under pressure, assuming the valve 71 to be open, and thus the fluid in the cylinder 61 is also placed under pressure and causes the piston 60 to move upwardly. The plate 54 will then move upwardly, overcoming the pressure of the compression springs 57 and causing the substantially annular gear member 46 to move upwardly so that its teeth 47 will engage mating teeth 74 in an annular gear 75. This annular gear 75 may be made integral with the fifth wheel plate 40 on the semi-trailer 41, if desired; however, the plate 40, as shown, is provided with a circular groove 76 in which the gear member 75 is mounted and the depth of this groove 76 is such that the lower surfaces of the teeth 74 of the gear member 75 will be flush with the lower surface of the plate 40. The gear member 75 is secured to the plate 40 by any suitable means such as screws 77.

Figures 5, 6:
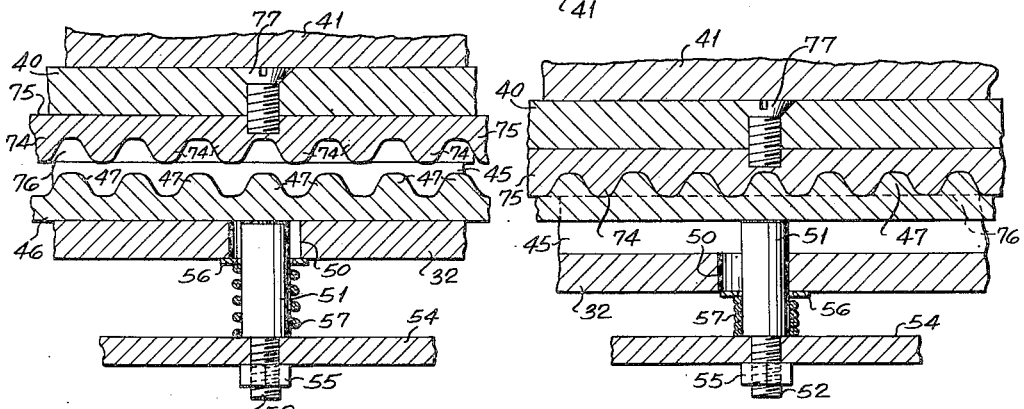
Figure 5 is an enlarged vertical sectional view taken substantially along the line 5—5 in Figure 2 and showing the gear teeth of the annular members spaced apart from each other.
Figure 6 is a view similar to Figure 5 but showing the gear teeth of the annular members in engagement with each other or in meshed position.

Since there is relative turning movement between the fifth wheel 32 and the mating plate member 40 on the semi-trailer 41, it may happen that the teeth 47 on the gear member 46 are not disposed in exact vertical alinement for meshing with the gear teeth 74 in the gear 75 upon the pedal 13 being moved in a counterclockwise direction in Figure 1. Therefore, the slots 50 are provided in the fifth wheel member 32 to allow the gear member 46 to rotate a slight amount within the groove 45. The proximate edges of the gear teeth 47 and 74 in the gear members 46 and 75, respectively, are rounded so as to provide a cam-like effect between the gear teeth as the gear member 46 is moved upwardly from the position shown in Figure 5 to the position shown in Figure 6 and it is thus seen that the gear member 46 may move circumferentially in the groove 76 so that its gear teeth 47 will finally be accurately enmeshed with the gear teeth 74 in the gear member 75.

Regardless of the angle at which the semi-trailer may be disposed relative to the longitudinal axis of the tractor upon the brakes being applied by an operator, it is seen that the gear teeth 47 and 74 of the gear members 46 and 75 respectively will be thrown into engagement with each other simultaneously upon the brakes being applied and which will prevent further swinging movement or jack-knifing between the tractor and the semi-trailer.

It might be stated that there is sufficient pressure in the braking system of vehicular tractors of the type disclosed to overcome any tendency of the teeth of the gear member 75 to override the teeth 47 in the gear member 46 and to cause the gear member 46 to be moved downwardly and out of engagement with the gear teeth 74 in the upper gear member 75 when considering the usual weight of a semi-trailer or the centrifugal force of the semi-trailer once it has started to turn about the axis of the fifth wheel.

The purpose of the manually operable valve 71 is to prevent pressure from being communicated to the cylinder 61 from the master cylinder 17 upon movement of the foot pedal 13 in a counterclockwise direction in Figure 1 and which may be desirable when moving the semi-trailer 41 into a restricted area and especially when backing the semi-trailer into a restricted area and moving the tractor at substantially right angles to the trailer as is usually required in parking the tractor on a narrow street.

It is a well known fact that in checking the speed of vehicles when moving down steep hills and around sharp curves the brakes are applied intermittently by the operator of the vehicle and, of course, with the present invention, there is no possibility of the trailer 41 jack-knifing relative to the tractor 10 upon the brakes being applied and in the event one or the other of the vehicles is caused to skid along the pavement. However, since the brakes are applied intermittently, it is manifest that the gear members 46 and 75 will not restrict desired relative movement between the trailer and the tractor when they are moving down grade and around a sharp curve and which would obviously require that the semi-trailer be turned at a considerable angle relative to the longitudinal axis of the tractor.

In many cases, such as around curves in mountainous country where gradual braking is applied, it is desirable that the gear 46 be not engaged with the gear 75 until a predetermined amount of brakes have been applied to the wheels of the tractor and trailer. The weight of the plate 54, bolts 52 and the gear 46 would naturally require that a predetermined amount of pressure be applied to the brakes of the trailer and tractor before sufficient pressure would be present in the cylinder 61 to raise the plate 54. In addition, it will be observed that the compression springs 57 (Figure 2) may be of sufficient rigidity so as to require any predetermined amount of poundage of pressure to be applied to the brakes of the tractor and trailer before overcoming the resistance of springs 57 to cause the gears 46 and 75 to become engaged. The rigidity of compression springs 57 could be sufficient to prevent engagement of the gears 46 and 75 until sufficient braking pressure has been built up to almost and actually lock the wheels of the tractor and trailer, such as would be necessary in an emergency application of the brakes to the wheels of the tractor and trailer.

It is manifest that the apparatus disclosed in this application would operate equally as well and would produce an identical result irrespective of whether it is used in conjunction with either pneumatic, vacuum or hydraulic braking systems, as the only requisite to efficient operation of this device is that pressure be exerted through the cylinder 61 to move piston 60 upwardly.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a tractor and trailer, the tractor having a fifth wheel and the trailer having a fifth wheel plate which is adapted to rest on the fifth wheel of the tractor, a vertically movable gear member mounted in the fifth wheel and having teeth on its upper surface, a mating gear member fixed in the fifth wheel plate of the trailer, means normally holding the gear in the fifth wheel in a lowered position out of engagement with the teeth in the gear in the fifth wheel plate of the trailer, said tractor having a foot operated brake mechanism therein, means automatically operable upon the foot operated brake mechanism being operated to cause the gear member in the fifth wheel to be projected into engagement with the gear member in the fifth wheel plate of the trailer to thus prevent relative turning movement between the tractor and the trailer whenever the brakes are in operative position.

2. In a tractor and trailer, the tractor having a fifth wheel and the trailer having a fifth wheel plate which is adapted to rest on the fifth wheel of the tractor, a vertically movable gear member mounted in the fifth wheel and having teeth on its upper surface, a mating gear member fixed in the fifth wheel plate of the trailer, means normally holding the gear in the fifth wheel in a lowered position out of engagement with the teeth in the gear in the fifth wheel plate of the trailer, said tractor having a foot operated brake mechanism therein, means automatically operable upon the foot operated brake mechanism being operated to cause the gear member in the fifth wheel to be projected into engagement with the gear member in the fifth wheel plate of the trailer to thus prevent relative turning movement between the tractor and the trailer whenever the brakes are in operative position, means automatically operable upon releasing the brake operating mechanism of the tractor for again moving said gear member in the fifth wheel out of engagement with the gear member in the fifth wheel plate of the trailer.

3. In a tractor-trailer vehicle combination, said tractor having a fifth wheel thereon and said trailer having a mating fifth wheel plate thereon adapted to have turning sliding movement against the fifth wheel of the tractor, said fifth wheel having a centrally located circular groove in its upper surface, a gear member mounted for vertical sliding movement in said groove and having gear teeth cut in its upper surface, the upper surface of said gear teeth normally being disposed flush with the upper surface of the fifth wheel, a plate disposed beneath the fifth wheel, a connection between the plate and the gear member in the fifth wheel, a piston secured to the lower surface of said plate, a cylinder mounted beneath the piston and in which the piston has vertical sliding movement, said tractor having a fluid brake system, a pipe connection between the fluid brake system of the tractor and the lower end of the cylinder whereby the piston will be projected upwardly upon the fluid brake system of the tractor being operated, a circular gear mounted in the mating fifth wheel plate of the trailer and adapted to be engaged by the teeth of the gear member in the fifth wheel when the piston is projected upwardly and which transmits upward movement to the gear member in the fifth wheel.

4. In a trailer-tractor combination, said tractor having a fifth wheel thereon and said trailer having a mating fifth wheel plate and means connecting the fifth wheel of the trailer for rotating movement against the fifth wheel of the tractor, said fifth wheel having a substantially circular groove in the upper surface thereof, a substantially annular gear member mounted for vertical sliding movement in the groove and having gear teeth on its upper surface, spring means normally holding said gear member in a lowered position in the fifth wheel so the upper surfaces of the teeth of the gear member will normally be flush with the supper surface of the fifth wheel, said mating fifth wheel plate on the trailer having a sunken gear member therein with gear teeth on the lower surface thereof, said gear teeth coinciding with the gear teeth on the gear member in the fifth wheel, said tractor having a manually operated fluid brake system connected to the rear wheels thereof, a cylinder-piston combination, a mechanical connection between the cylinder-piston combination and the gear member in the fifth wheel and a fluid connection between the braking system of the tractor and the cylinder-piston combination whereby, upon the braking system of the tractor being operated, fluid pressure will cause relative movement between the cylinder and the piston and will thus cause the gear member in the fifth wheel to move outwardly with respect to the fifth wheel and into engagement with the gear member in the mating fifth wheel plate of the trailer to thus prevent further turning movement of the trailer relative to the tractor.

5. In a trailer-tractor combination, said tractor having a fifth wheel thereon and said trailer having a mating fifth wheel plate and means connecting the fifth wheel of the trailer for rotating movement against the fifth wheel of the tractor, said fifth wheel having a substantially circular groove in the upper surface thereof, a substantially annular gear member mounted for vertical sliding movement in the groove and having gear teeth on its upper surface, spring means normally holding said gear member in a lowered position in the fifth wheel so the upper surfaces of the teeth of the gear member will normally be flush with the upper surface of the fifth wheel, said mating fifth wheel plate on the trailer having a sunken gear member therein with gear teeth on the lower surface thereof, said gear teeth coinciding with the gear teeth on the gear member in the fifth wheel, said tractor having a manually operated fluid brake system connected to the rear wheels thereof, a cylinder-piston combination, a mechanical connection between the cylinder-piston combination and the gear member in the fifth wheel and a fluid connection between the braking system of the tractor and the cylinder-piston combination whereby, upon the braking system of the tractor being operated, fluid pressure will cause relative movement between the cylinder and the piston and will thus cause the gear member in the fifth wheel to move outwardly with respect to the fifth wheel and into engagement with the gear member in the mating fifth wheel plate of the trailer to thus prevent further turning movement of the trailer relative to the tractor, said spring means for holding the gear member in the fifth wheel in a lowered position comprising said fifth wheel having a plurality of slots therein communicating with the groove in which the gear member is mounted, pins projecting from the gear member and loosely penetrating said slots, a plate secured to the lower ends of said pins, compression springs between the last-named plate and the lower surface of the fifth wheel thus normally urging the plate and the pins and the gear member downwardly and said cylinder-piston combination being connected to the lower surface of said plate member whereby, relative movement between the gear member and the fifth wheel, about the axis of the fifth wheel, is allowable to provide for proper engagement of the teeth in the gear member associated with the fifth wheel with the teeth in the gear member associated with the mating fifth wheel plate of the trailer.

6. In a tractor-trailer vehicle combination having a pivotal connecting member transmitting motive force from the tractor to the trailer and serving as a pivot for relative turning movement of the tractor and the trailer, apparatus for preventing jack-knifing of the tractor-trailer vehicle combination comprising a substantially circular axially movable gear member carried by one of said vehicles, the other of said vehicles having a substantially circular mating gear member fixed thereto, each of said substantially circular gear members having teeth on the proximate surfaces thereof, means for moving the teeth of said movable member into engagement with the teeth in said fixed member to resist relative turning movement of the tractor and the trailer, 7. In a tractor and trailer, the tractor having a fifth wheel and the trailer having a fifth wheel plate which is adapted to rest on the fifth wheel of the tractor, a vertically movable gear member mounted in the fifth wheel and having teeth on its upper surface, a mating gear member fixed in the fifth wheel plate of the trailer, means normally holding the gear in the fifth wheel in a lowered position out of engagement with the teeth in the gear in the fifth wheel plate of the trailer, said tractor having a foot operated brake mechanism therein, means automatically operable upon the foot operated brake mechanism being operated to cause the gear member in the fifth wheel to be projected into engagement with the gear member in the fifth wheel plate of the trailer to thus prevent relative turning movement between the tractor and the trailer whenever the brakes are in operative position, and means operable at will for disconnecting the brake mechanism from the gear member in the fifth wheel.

8. In a tractor and trailer, the tractor having a fifth wheel and the trailer having a fifth wheel plate which is adapted to rest on the fifth wheel of the tractor, a vertically movable gear member mounted in the fifth wheel and having teeth on its upper surface, a mating gear member fixed in the fifth wheel plate of the trailer, means normally holding the gear in the fifth wheel in a lowered position out of engagement with the teeth in the gear in the fifth wheel plate of the trailer, said tractor having a foot operated brake mechanism therein, means automatically operable upon the foot operated brake mechanism being operated to cause the gear member in the fifth wheel to be projected into engagement with the gear member in the fifth wheel plate of the trailer to thus prevent relative turning movement between the tractor and the trailer whenever the brakes are in operative position, means automatically operable upon releasing the brake operating mechanism of the tractor for again moving said gear member in the fifth wheel out of engagement with the gear member in the fifth wheel plate of the trailer and means operable at will for disconnecting the brake mechanism from the gear member in the fifth wheel.

9. In a tractor-trailer vehicle combination, said tractor having a fifth wheel thereon and said trailer having a mating fifth wheel plate thereon adapted to have turning sliding movement against the fifth wheel of the tractor, said fifth wheel having a centrally located circular groove in its upper surface, a gear member mounted for vertical sliding movement in said groove and having gear teeth cut in its upper surface, the upper surface of said gear teeth normally being disposed flush with the upper surface of the fifth wheel, a plate disposed beneath the fifth wheel, a connection between the plate and the gear member in the fifth wheel, a piston secured to the lower surface of said plate, a cylinder mounted beneath the piston and in which the piston has vertical sliding movement, said tractor having a fluid brake system, a pipe connection between the fluid brake system of the tractor and the lower end of the cylinder whereby the piston will be projected upwardly upon the fluid brake system of the tractor being operated, a circular gear mounted in the mating fifth wheel plate of the trailer and adapted to be engaged by the teeth of the gear member in the fifth wheel when the piston is projected upwardly and which transmits upward movement to the gear member in the fifth wheel, and means operable at will for disconnecting the cylinder from the fluid brake system.

10. In a trailer-tractor combination, said tractor having a fifth wheel thereon and said trailer having a mating fifth wheel plate and means connecting the fifth wheel of the trailer for rotating movement against the fifth wheel of the tractor, said fifth wheel having a substantially circular groove in the upper surface thereof, a substantially annular gear member mounted for vertical sliding movement in the groove and having gear teeth on its upper surface, spring means normally holding said gear member in a lowered position in the fifth wheel so that the upper surfaces of the teeth of the gear member will normally be flush with the upper surface of the fifth wheel, said mating fifth wheel plate on the trailer having a sunken gear member therein with gear teeth on the lower surface thereof, said gear teeth coinciding with the gear teeth on the gear member in the fifth wheel, said tractor having a manually operated fluid brake system connected to the rear wheels thereof, a cylinder-piston combination, a mechanical connection between the cylinder-piston combination and the gear member in the fifth wheel and a fluid connection between the braking system of the tractor and the cylinder-piston combination whereby, upon the braking system of the tractor being operated, fluid pressure will cause relative movement between the cylinder and the piston and will thus cause the gear member in the fifth wheel to move outwardly with respect to the fifth wheel and into engagement with the gear member in the mating fifth wheel plate of the trailer to thus prevent further turning movement of the trailer relative to the tractor and means operable at will for disconnecting the cylinder from the fluid brake system.

WILLIAM L. PLAXCO.

REFERENCES CITED

The following references are of record in the file of this patent:

UNITED STATES PATENTS

| Number | Name | Date |
|---|---|---|
| 1,179,793 | Barber | Apr. 18, 1916 |
| 2,073,269 | Skibbe | Mar. 9, 1937 |
| 2,213,221 | Johnson | Sept. 3, 1940 |